United States Patent [19]

Yeates et al.

[11] 4,190,390
[45] Feb. 26, 1980

[54] APPARATUS FOR MACHINING CRITICAL SURFACES OF RAILROAD TRUCK SIDE FRAMES

[75] Inventors: Richard P. Yeates, Downers Grove; Boris S. Terlecky, Fox Lake; Jagdish K. Shah, Chicago, all of Ill.

[73] Assignee: Trailer Train Company, Chicago, Ill.

[21] Appl. No.: 945,215

[22] Filed: Sep. 25, 1978

[51] Int. Cl.² .............................................. B23C 3/00
[52] U.S. Cl. .............................. 409/198; 29/48.5 R; 408/89
[58] Field of Search .................... 90/15 R, 15.1, 56 R, 90/11 E; 408/71, 89; 51/241 S, 241 G; 29/48.5 R, 48.5 A

[56] References Cited

U.S. PATENT DOCUMENTS

| | | | |
|---|---|---|---|
| 2,008,083 | 7/1935 | Muller | 90/15 R |
| 2,391,511 | 12/1945 | Pioch | 29/33 |
| 3,053,119 | 9/1962 | Anderson | 408/89 |
| 3,066,782 | 12/1962 | Olton | 409/94 |
| 3,230,832 | 1/1966 | Cox | 90/11 R |
| 3,581,623 | 6/1971 | Galbarini | 90/15 R X |
| 3,780,619 | 12/1973 | Kitamura et al. | 90/15 R |
| 3,998,127 | 12/1976 | Romeu | 90/15 R X |
| 4,036,107 | 7/1977 | Constantine | 90/15 R X |

Primary Examiner—Z. R. Bilinsky
Attorney, Agent, or Firm—Haight, Hofeldt, Davis & Jambor

[57] ABSTRACT

Disclosed is an apparatus for permitting automatic and manual machining of critical wear surfaces of railroad truck side frames. A fixture is rotatably mounted on a base. The railroad truck side frame is mounted on the fixture with the fixture and side frame in a first or vertical position. The side frame is first leveled vertically on the fixture with respect to leveling plates and then aligned horizontally before it is rigidly clamped to the fixture. Pivotably mounted gauges are then used to determine the exact location of the pedestal roof areas of the side frame with respect to the fixture, and this positional information from the gauges is manually transferred to adjustable stop dogs that engage limit switches that control the movement of a machining head. The fixture is then rotated 90° and locked in that position. A machining head is then automatically operated, once AUTO-CYCLE button has been pushed "in," to first move parallel to the axis of rotation of the side frame until it is aligned with the pedestal roof area then horizontally in a direction perpendicular to the axis of rotation of the fixture until it has reached the proper depth for machining. The head then moves vertically across the pedestal roof surface to machine the pedestal roof area to the proper depth, and then back to its original retracted position. The machining head then automatically moves to proper alignment with the other pedestal roof area of the side frame and completes the same machining steps automatically. The apparatus also has manual controls so that the column guide wear surface and the anti-rotation stop surface can also be machined. The fixture is rotated 90° to align these surfaces in proper position for machining by the machine head.

9 Claims, 11 Drawing Figures

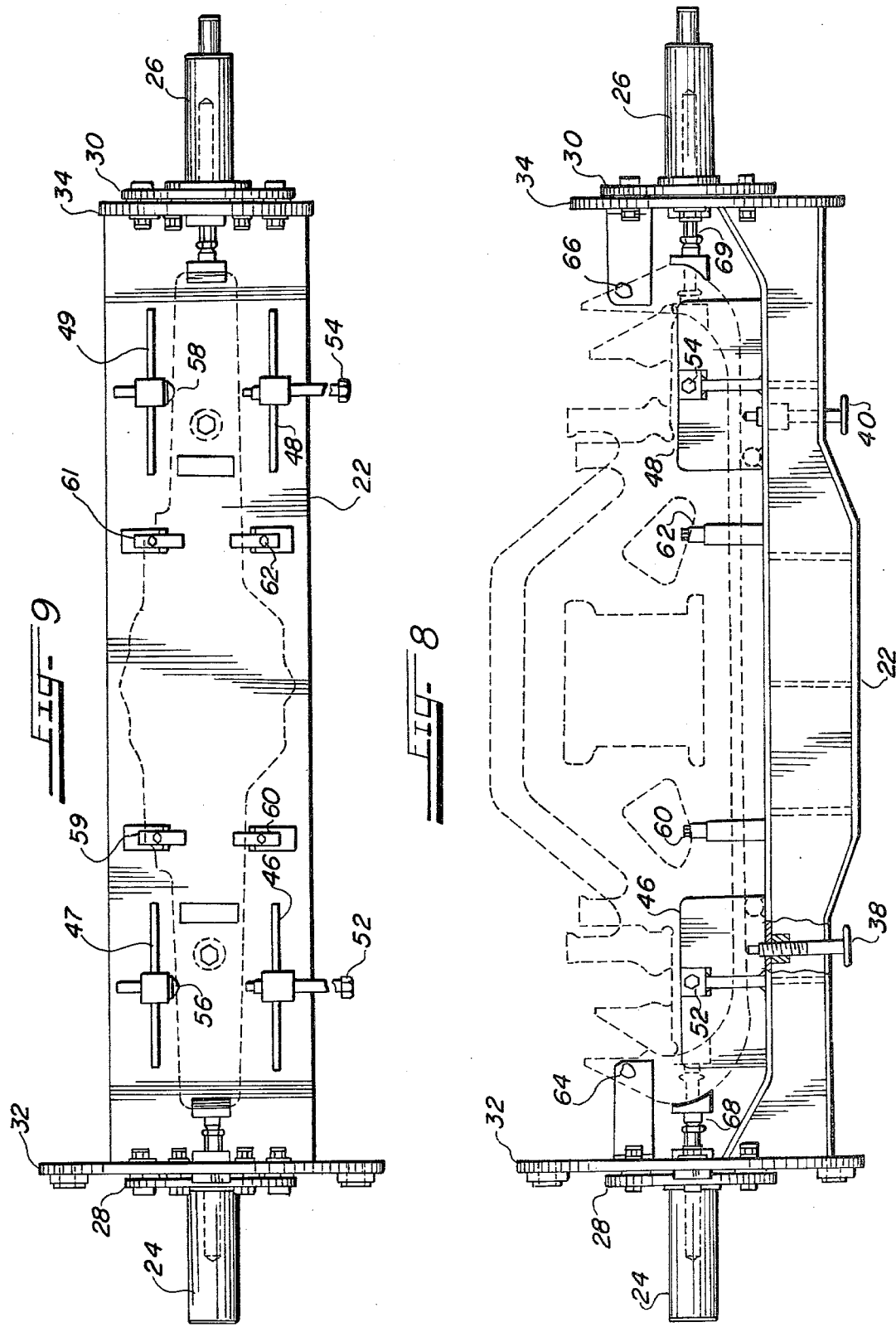

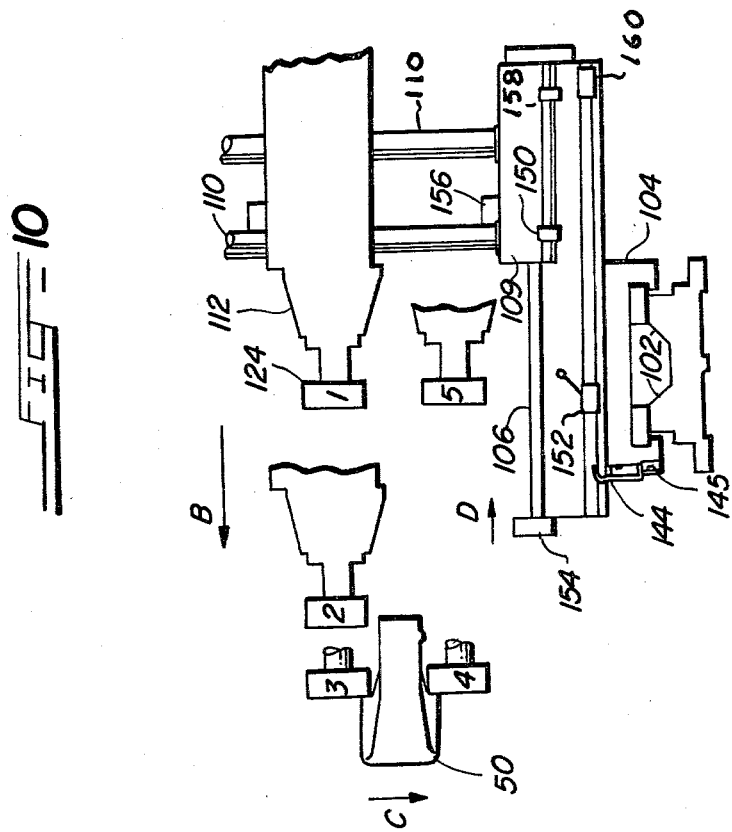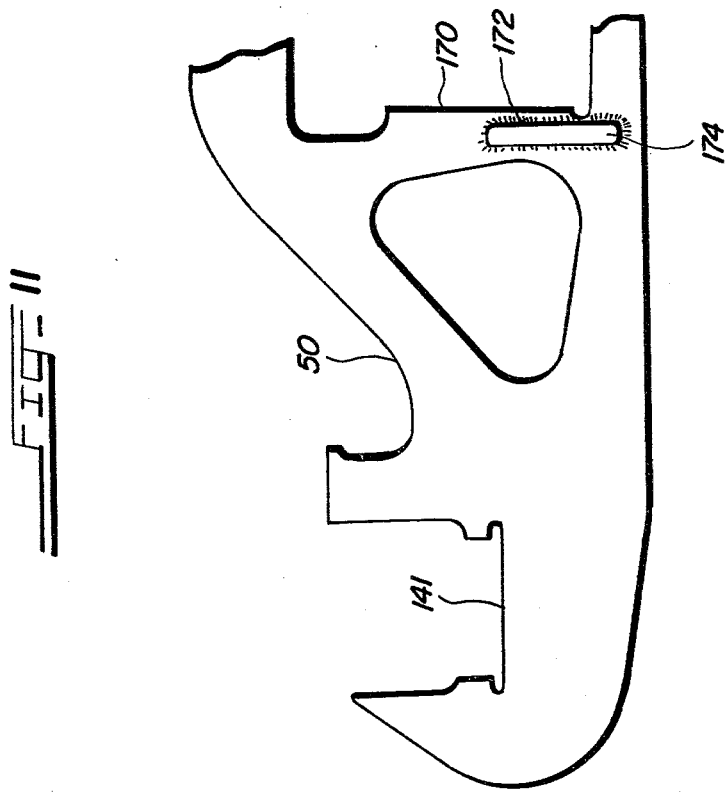

APPARATUS FOR MACHINING CRITICAL SURFACES OF RAILROAD TRUCK SIDE FRAMES

BACKGROUND OF THE INVENTION

1. Field of the Invention

The present invention relates to apparatus for machining railroad truck side frames of various load capacities. More particularly, the present invention relates to apparatus which permits the machining of all critical wear surfaces of railroad truck side frames without removing the side frame from the apparatus once it is properly positioned on the apparatus.

2. Description of the Prior Art

Because of the tremendous friction and wear forces experienced by railroad wheel trucks, the various wear surfaces of those trucks are subjected to severe wear and abrasion. Consequently, these critical surfaces of the railroad truck must be periodically repaired to allow extended life of an otherwise serviceable railroad wheel truck. In this regard, the worn surfaces must be machined to remove the pitted and worn surface and a new surface in the form of a wear plate of a predetermined thickness must be welded to rebuild the worn surface.

Heretofore, railroad side frames and railroad trucks have been machined by conventional machining apparatus which has not been specifically designed for machining such side frames. Thus, substantial setup time has been required to assure proper machining of those surfaces. Some attempts have been made in the past to provide machining equipment especially adapted to machine railroad trucks. However, such attempts have not proved to be commercially acceptable. For example, U.S. Pat. No. 2,008,083—Muller discloses one such prior art apparatus which has never achieved commercial success in this country. Accordingly, it would be a highly desirable advance in the art to provide an apparatus for machining the critical surfaces of a railroad side frame that permits highly accurate machining of those surfaces at greater speed, economy and convenience than has been permissible using prior art conventional machining apparatus.

BRIEF DESCRIPTION OF THE INVENTION

An apparatus for machining the critical surfaces of railroad truck side frames in accordance with the present invention comprises a base having a fixture rotatably mounted to the base. The fixture includes leveling means for leveling the side frame on the fixture, stop means for aligning the side frame on the fixture, clamp means for clamping the side frame on the fixture, and gauge means for measuring the position of certain critical surfaces of the side frame. Means are provided for rotating the fixture between several predetermined positions, and lock means are provided for locking the fixture in selectable ones of said predetermined positions. A machining head is mounted on the base for movement in a first direction parallel to the axis of rotation of said fixture, for movement in a second position horizontally and perpendicularly to the axis of rotation of said fixture, and for movement in a third direction vertically and perpendicularly to the axis of rotation of said fixture. First stop means are provided for controlling the limits of travel of the machining (milling) head in the first direction, second stop means are provided for controlling the limits of travel of the machining (milling) head in the second direction, and third stop means are provided for controlling the limits of travel of the machining head in the third direction. Means are also provided for adjusting the first stop means in accordance with the measurements of the gauge means. In addition to automatic machining of certain critical surfaces of the side frame, the apparatus may also include manual control means to permit operator positioning and control of the machining head so that other critical surfaces may also be machined.

Thus, it is a principal object of the present invention to provide an apparatus for machining critical wear surfaces of a railroad truck side frame that allows certain of the surfaces to be automatically machined once the side frame is properly positioned and aligned on the fixture.

Yet another object of the present invention is to provide an apparatus for machining critical wear surfaces of railroad truck side frames that allows all of the critical wear surfaces to be machined without removing the side frame from the apparatus.

Yet another object of the present invention is to provide an apparatus for machining critical wear surfaces of railroad truck side frame wherein all of the critical wear surfaces of the side frame can be machined with but a single machining head.

Yet another object of the present invention is to provide gauge means for determining the exact position of the side frame on the fixture and transferring this information to adjustable stops that control positioning of the machining head so that the machining head can automatically move to machine the critical surfaces irrespective of any differences in the size or configuration of the side frame.

These and other ojbects, advantages, and features shall hereinafter appear, and for the purposes of illustration, but not for limitation, an exemplary embodiment of the present invention is illustrated in the accompanying drawings and described in the followng detailed description.

BRIEF DESCRIPTION OF THE DRAWINGS

FIG. 8 is an enlarged side view of the side frame fixture of the present invention illustrating the adjustability of that fixture for different sizes of side frames.

FIG. 9 is a top view of the fixture illustrated in FIG. 8.

FIG. 10 is a cross-sectional partially fragmentary view of the machining head showing the positions of the head during various stages of milling of the pedestal roof surfaces of the side frame.

FIG. 11 is a side partially fragmentary view of the end of a side frame showng the various wear surfaces that can be machined by the present invention.

DETAILED DESCRIPTION OF THE PREFERRED EMBODIMENT

Figure 1:
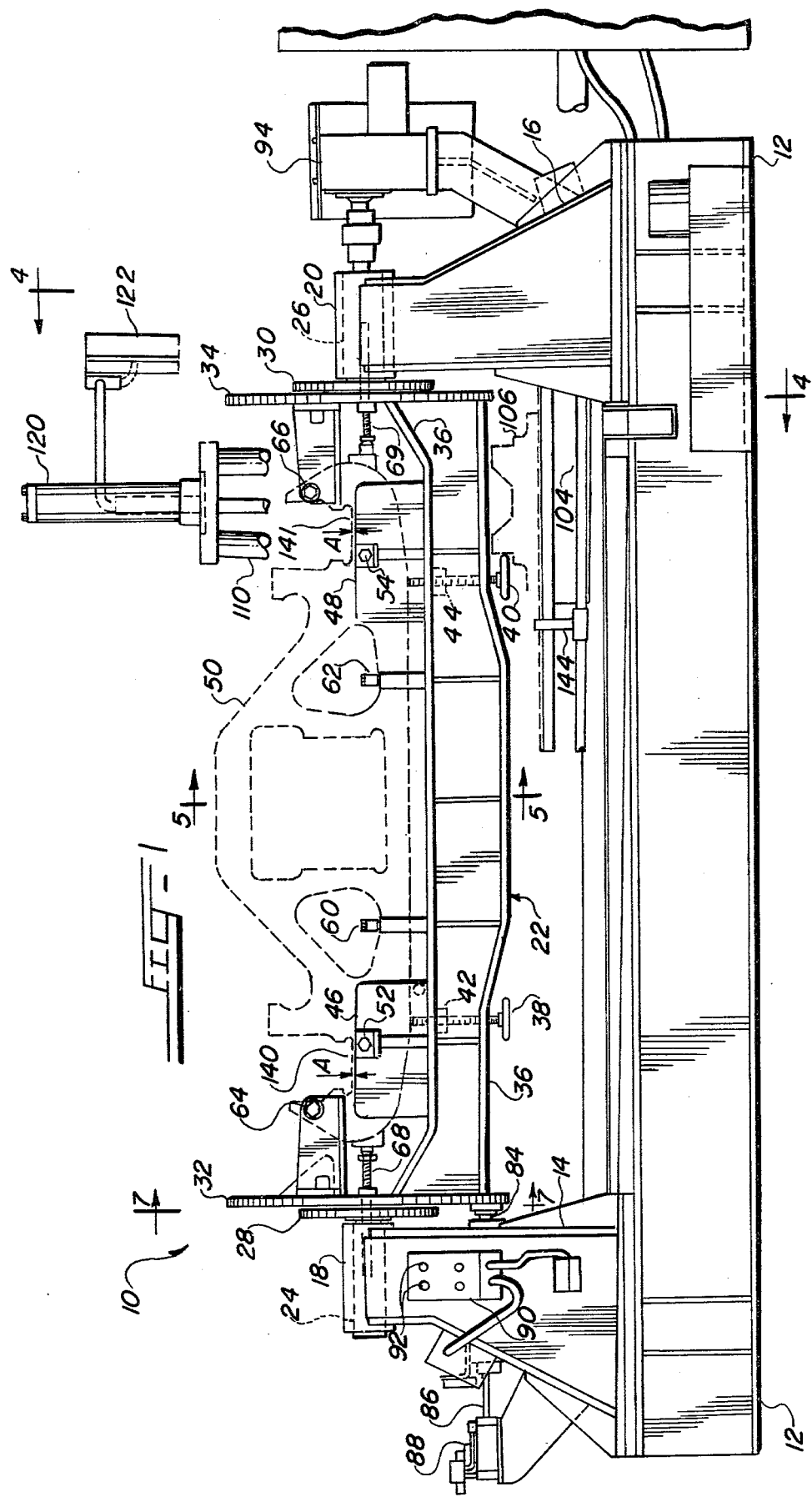
FIG. 1 is a side elevational partially fragmentary view of a preferred embodiment of the present invention.
Figure 2:
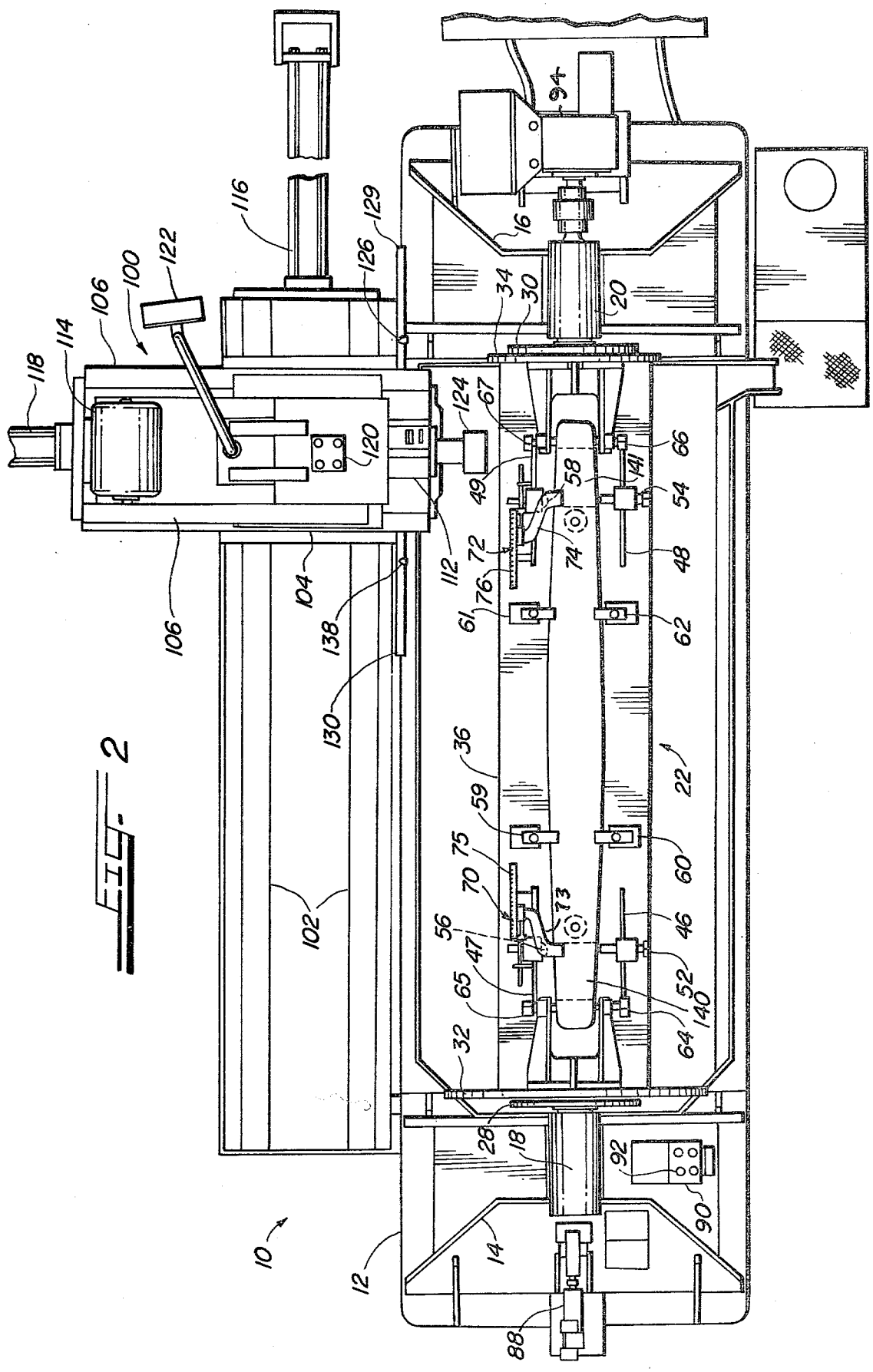
FIG. 2 is a top plan view of the preferred embodiment illustrated in FIG. 1.

With reference to FIGS. 1 and 2, apparatus 10 comprises a base 12 having vertically extending support members 14 and 16. Mounted on the upper ends of support members 14 and 16 are bearings 18 and 20 which rotatably support a fixture assembly 22. Assembly 22 comprises shafts 24 and 26 which are supported by bearings 18 and 20 and which are connected to mounting plates 28 and 30 respectively. The mounting plates 28 and 30 are in turn bolted to end plates 32 and 34 between which is welded a base member 36. Threaded leveling jacks 38 and 40 engage threaded blocks 42 and 44 welded to the interior bottom surface of base member 36. Fixture assembly 22 also includes leveling plates 46, 47, 48, and 49 which extend vertically from the upper surface of base member 36 on each side of a railroad truck side frame 50. Mounted on leveling plates 46 and 48 are screw clamps 52 and 54, and mounted on leveling plates 47 and 49 are fixed stops 56 and 58 (see FIGS. 2 and 9). Fixture assembly 22 also includes center clamps 59, 60, 61, and 62; end clamps 64, 65, 66, and 67; and threaded end pads 68 and 69.

Also mounted on leveling plates 47 and 48 are gauge means 70 and 72. Gauge means 70 and 72 are pivotably mounted so that arms 73 and 74 can be pivoted to the position illustrated in FIG. 2 to locate the pedestal roof areas of the side frame. Arms 73 and 74 may be pivoted perpendicular to the position shown so that they are in a non-interfering position away from the machining head. Gauge means 70 and 72 also include scales 75 and 76 (see FIG. 2) which provides a measurement of the relative positions of the ends of arms 73 and 74. The purpose of these scales will be more fully described below.

Figure 7:
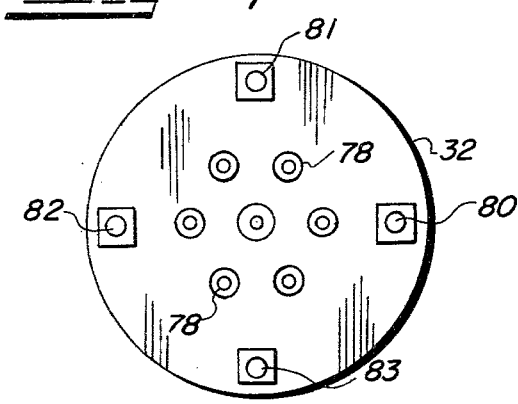
FIG. 7 is a plane elevational view of the fixture stop plate taken substantially along line 7—7 in FIG. 1.

With reference to FIG. 7, a front view of end plate 32 is illustrated. Plate 32 has threaded holes 78 for mounting plate 28 and four circular openings 80, 81, 82, and 83 are positioned at 90° intervals around the periphery of plate 32.

With reference to FIG. 1, a stop pin 84 is mounted for linear movement on support member 14. Stop pin 84 is attached to a shaft 86 of a hydraulic cylinder 88 that can be controlled to cause stop pin 84 to move to the right as viewed in FIG. 2 into engagement with one of holes 80-83 or to the left as viewed in FIG. 2 out of engagement therewith. Thus, stop pin 84 provides a means of locking the fixture assembly in one of four positions, ninety degrees apart. A control box 90 having control buttons 92 controls the operation of the hydraulic cylinder and the operation of an electric motor 94 mounted at the opposite end of apparatus 10 which is connected to shaft 26. Motor 94 causes fixture 22 to rotate.

Apparatus 10 also includes a milling assembly 100. Milling assembly 100 comprises longitudinal tracks 102 which are attached to base 12 and run parallel to the direction of the axis of rotation of fixture 22. Supported for sliding movement on tracks 102 is a trolley bed 104 (see FIGS. 2 and 4). Trolley bed 104 supports longitudinal tracks 106, and another smaller trolley bed 108 rides on tracks 106 in a horizontal direction perpendicular to the axis of rotation of fixture 22. Mounted on trolley bed 108 are vertically extending columns 110 upon which is slidably mounted a milling head 112. A motor 114 drives milling head 112 and rotates a milling tool 124.

A hydraulic cylinder 116 moves trolley bed 104 along tracks 102. Similarly, a hydraulic cylinder 118 moves trolley bed 108 along tracks 106. Also, a hydraulic cylinder 120 moves the milling head 112 vertically along columns 110. A control box 122 allows manual control of the position of the milling head as well as controlling the starting and stopping of rotation of tool 124 mounted to milling head 112. Control box 122 also is used to initiate automatic operation.

Figure 3:
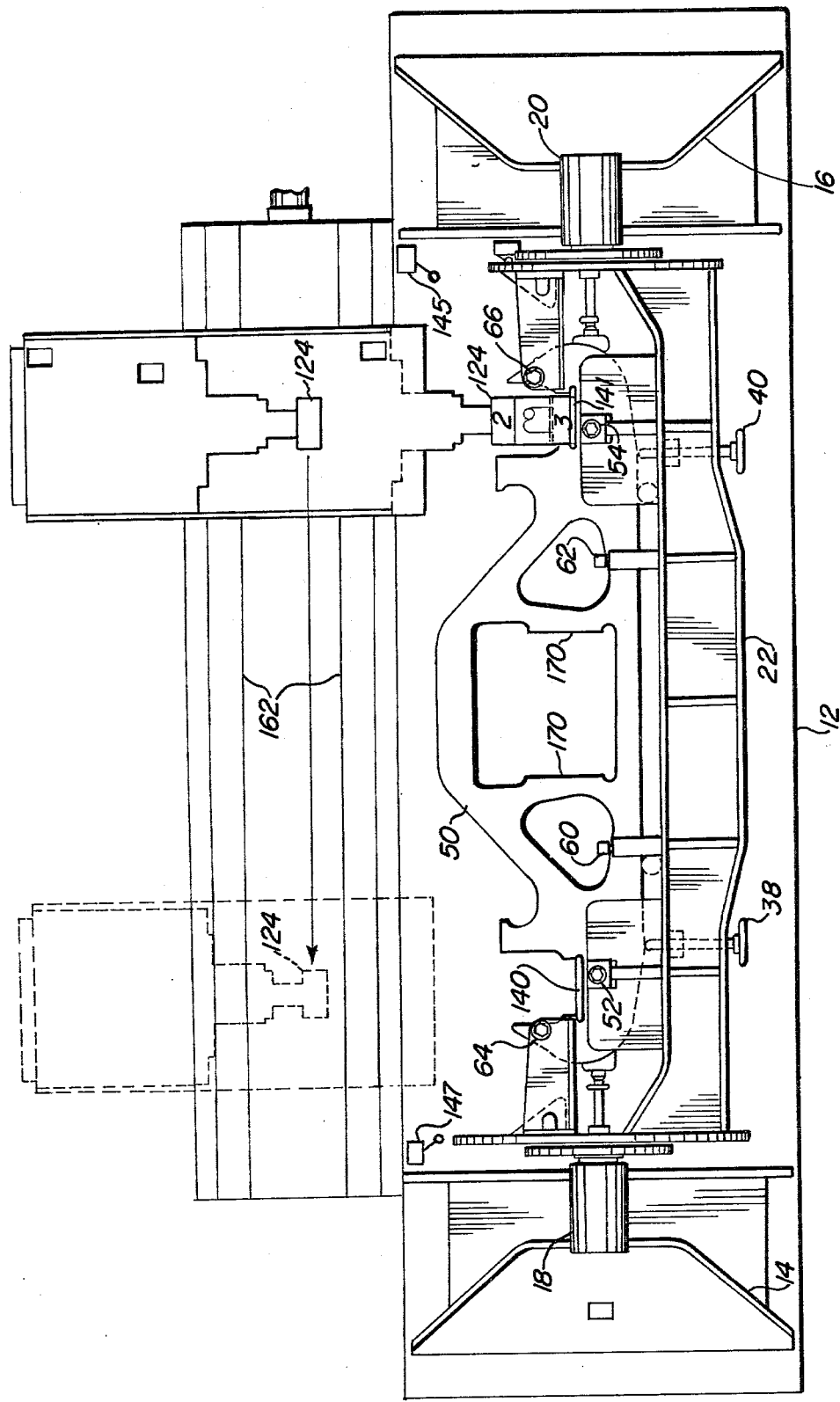
FIG. 3 is a top view of the preferred embodiment showing the fixture pivoted to permit machining of the pedestal roof areas of the side frame and showing the relative positions of the machining head during machining.

Mounted on scales 129 and 130 positioned parallel to tracks 102 are limit indicators 126 and 128. Movement of indicators 126 and 128 along scales 129 and 130 moves trip dogs 144 (see FIG. 4) that contact limit switches 145 and 147 (see FIG. 3) to control the stop positions of trolley bed 104 at each end of tracks 102.

Further description of the preferred embodiment can be facilitated by describing the operation of the embodiment. With the fixture 22 in the position illustrated in FIG. 1, and with various clamps in an open position, a side frame 50 is lowered by a crane or winch until it is in approximately the position illustrated in FIG. 1. By the use of threaded end pads 68, the side frame 50 is roughly centered on fixture 22 but end clamps 68 and 69 are not tightened. Using leveling jacks 38 and 40, the side frame is then leveled on fixture 22 so that dimension A (see FIG. 1) between the pedestal roof surfaces 140 and 141 and the upper surface of leveling plates 46–49 is the same for both sides of the side frame 50. With the side frame 50 in the leveled position, clamps 52 and 54 are tightened aligning the side frame against the fixed stops 56 and 58 thereby aligning the side frame 50 horizontally with respect to fixture 22. Clamps 59–62 and 64–69 are then tightened locking the side frame 50 in fixture 22 at the desired position.

Once properly positioned, arm 73 and 74 of gauges 70 and 72 are pivoted down and adjusted until they engage the interior edge of the pedestal roof pocket side frame 50 as shown in FIG. 2. The position of the arms of gauges 70 and 72 are determined on scale 75 and 76 and this reading is transferred manually to indicators 128 and 129 on scales 129 and 130 (see FIG. 2) so that the stop dogs 144 are in the proper position to engage the limit switches 145 and 147 when the milling head 112 is in the correct position to mill the pedestal roof surfaces 140 and 141 of side frame 50. The pedestal roof surfaces 140 and 141 of side frame 50 are considered to be critical wear surfaces of the side frame since they are subject to substantial wear but must be maintained at a relatively close tolerance to assure proper alignment of the wheel axles of the railroad wheel truck.

Gauge means 70 and 72 allow adjustment of the stop dogs 144 so that the stop positions of the machining head can be varied depending upon the size of the side frame mounted in the fixture 22. For example, with reference to FIG. 8, it can be seen that fixture 22 is adapted to mount a variety of different shapes and sizes of side frames. Typical sizes of side frames are 55 ton, 70 ton, 70 ton wide jaw, and 100 ton side frames. Thus, by movement of pointers 126 and 128, trip dogs 144 are positioned to engage limit switches 145 and 147 (see FIGS. 3 and 4) at the proper time to stop head 112 in the correct position. This assures that the milling head 124 will be properly centered on the pedestal roof surfaces 140 and 141 at the limits of travel of bed 104. Once indicators 128 and 129 have been set, gauge arm 73 and 74 are pivoted away from the pedestal roof areas 141 and 140 so that they do not interfere with the milling operation.

Figure 4:
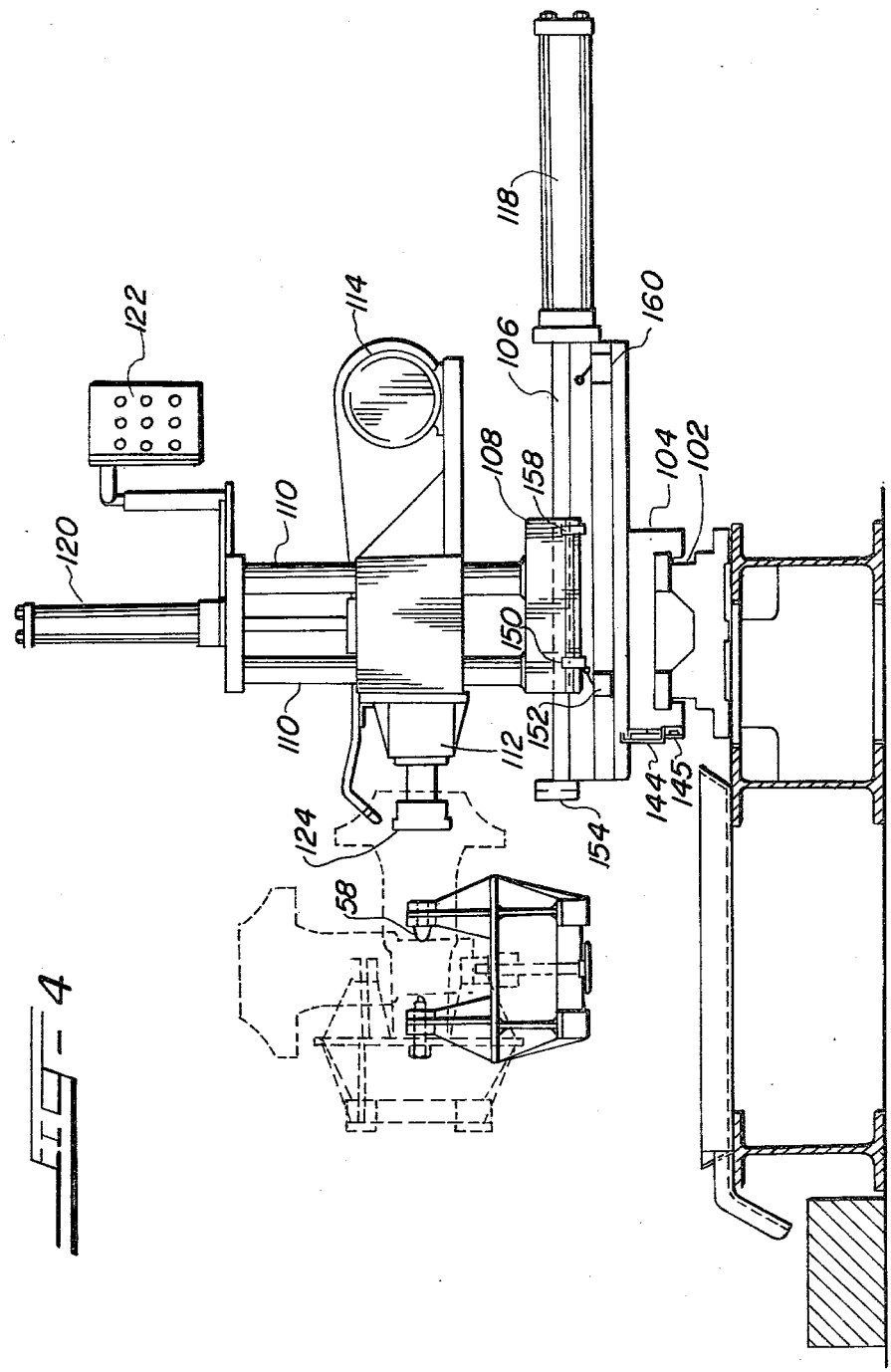
FIG. 4 is a partially fragmentary partially cross-sectional end view of the preferred embodiment of the present invention showing the relative positions of the fixture and side frame.

Once all the limits have been set, fixture 22 is then pivoted 90° as illustrated in FIG. 4 by causing hydraulic cylinder 88 to remove stop pin 84 from the opening 83 in end plate 32 so that motor 94 can rotate fixture 22 ninety degrees. Stop pin 84 is then reinserted into opening 82 by the operation of hydraulic cylinder 88 under the control of control box 90 thereby locking the fixture 22 in the correct position for milling the pedestal roof surfaces 140 and 141.

The milling head 112 is normally in the position illustrated in FIG. 8 which is the "home position." Upon pushing of the "autocycle" button located on pendant control box 122, the milling head 112 starts moving to the left as viewed in FIG. 8 in the direction of arrow B and the milling tool 124 is rapidly rotated by motor 114. As hydraulic cylinder 118 moves trolley bed 108 and milling head 112 in the direction of arrow B in FIG. 8, a trip dog 150 on the side of trolley bed 108 engages a limit switch 152 which causes the speed of forward movement of bed 108 to be slowed by restricting operation of hydraulic cylinder 118. At this time, tool 124 is in the position illustrated and designated by numeral "2" in FIG. 8. Thereafter, the trolley bed 108 and milling head 112 advances at a much slower rate until the edge 109 of trolley bed 108 engages a fixed stop 154 mounted on the edge of track assembly 106. At this point, the tool 124 is in the position designated by the numeral "3" in FIG. 8. This position is a predetermined position which is established with reference to the dimension A used when leveling the side frame 50 with respect to the leveling plates 46–49 as previously discussed with respect to FIG. 1. Thus, in position 3 in FIG. 8, the tool is in the proper position for milling the pedestal roof areas 140 and 141 of the side frame 50 to a predetermined depth. After a slight time delay has elapsed, the milling head starts moving slowly from position 3 to position 4 in the direction of arrow C at a machining feed rate cutting across the face of the pedestal roof area removing the metal and giving a very smooth surface. The downward motion in the direction of arrow C is automatically stopped when the bottom of the milling head 112 engages a limit switch 156. At this point, the head moves in the direction of arrow D to the position designated by the numeral 5 in FIG. 8 so that the tool is completely withdrawn. In position 5, a trip dog 158 engages a limit switch 160 which causes the milling head 112 to move back to the "home position" designated by the numeral 1 in FIG. 8.

Hydraulic cylinder 116 is then automatically operated to move trolley bed 104 along tracks 102 until trip dog 144 engages a limit switch 147 (see FIG. 3) which stops the movement of trolley bed 104 in the position 6 ready to mill the other pedestal roof surface 140 of the side frame 50. The machining head 112 is then advanced through the same positions 2, 3, 4, and 5 as previously described with respect to FIG. 8 causing the milling of the other pedestal roof surface. Thus, both pedestal roof surfaces of the side frame can be automatically machined without removal of the side frame from the apparatus. This system is designed so that the automatic machine operation of the pedestal roof surfaces 140 and 141 can be completed automatically starting the machining head at either end of the side frame 50. Because of the leveling adjustment and the accurate determination of dimension A in FIG. 1, the machining operation will provide an equal height on both pedestal roof areas so that the same thickness wear plates can be welded to the side frame 50 so that the side frame 50 can be reassembled into a railroad truck and continued to be used.

The present invention may also be utilized to machine other critical wear surfaces of the side frame 50. In particular, with reference to FIG. 11, side frame 50 also has two other critical wear surfaces that typically must be machined and wear plates added to rehabilitate a used side frame. In particular, the column guide wear area designated by the number 170 is one such critical surface. Also, the edge 172 of anti-rotation stop 174 also typically must be machined to rehabilitate used railroad side frames.

Figure 5:
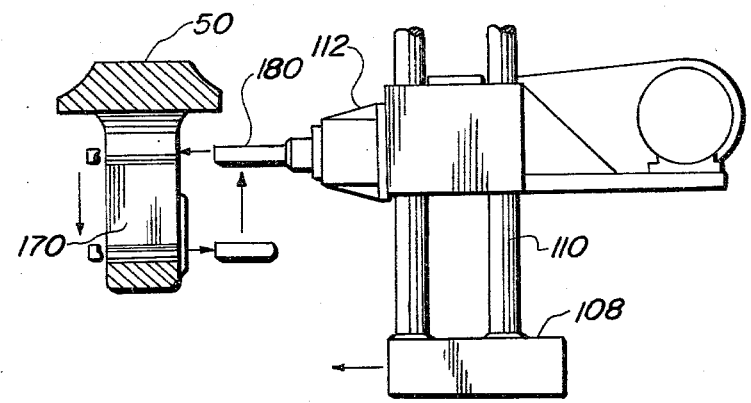
FIG. 5 is a partially fragmentary cross-sectional view of the side frame and machining head showing the movement of the machining head during machining of the column guide wear surface.

With reference to FIG. 5, the sequence of movement of the milling head 112 is illustrated to affectuate machining of column guide wear surface 170. An eight inch long by two inch diameter hog mill 180 is used in place of tool 124. The side frame 50 is pivoted until it is in the vertical position as illustrated in FIG. 1 and the milling head 112 is positioned by manual control through control box 122 so that as it traverses surface 170 in a downward direction it mills that surface.

Figure 6:
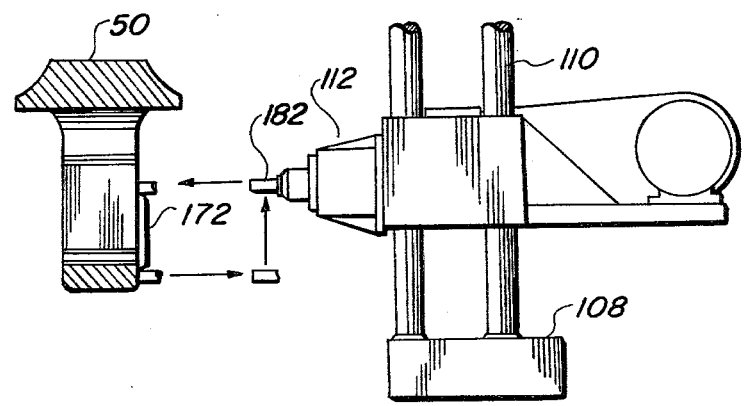
FIG. 6 is a partially fragmentary cross-sectional view of the side frame and machining head showing the relative movement of the machining head during machining of the anti-rotation stop wear surface.

Similarly, in FIG. 6, the sequence of movement to mill the anti-rotation stop surface 172 is illustrated. In this instance, a one inch diameter three inch long hog mill 182 is used. In this instance, movement of the machine head 112 is controlled manually by the control box 122. It should be apparent to anyone skilled in the art that appropriate limit switches could be incorporated to allow for semi-automatic operation for machining both the column guide wear surface 170 and the anti-rotation stop surface 172.

Accordingly, it should be apparent that the present invention combines a number of very desirable advantages and features over prior art conventional milling equipment. In particular, the present invention permits all of the critical surfaces of the side frame to be machined without removing the side frame from the fixture once the side frame has been properly positioned and locked on the fixture 22. Thus, the milling operation can be conducted much more rapidly than a similar milling operation can be accomplished on conventional equipment where it is necessary to move and physically set up and adjust the side frame for each subsequent operation. Further, once the side frame has been leveled and properly aligned, both of the pedestal roof areas can be machined to the same depth by an automatic operation so that identical wear plates can be installed. Moreover, because of the adjustable nature and adaptability of the present invention, a variety of different sizes and configurations of side frames may be machined.

Further, it should be apparent that various alterations, changes, or modifications may be made to the structure illustrated in the accompanying drawings and described above without departing from the spirit and scope of the present invention as defined in the appended claims.

We claim:

1. An apparatus for machining critical wear surfaces of railroad truck side frame comprising:
   a base;
   a fixture rotatably mounted on the base, said fixture including leveling means for vertically leveling certain critical surfaces of the side frame on the fixture, stop means for horizontally aligning the side frame on the fixture, clamp means for clamping the side frame on the fixture, and gauge means for measuring the position of the certain critical surfaces of the side frame with respect to the fixture;

means for rotating the fixture between predetermined positions;

lock means for locking the fixture in selectable ones of said predetermined positions;

a machining head mounted on said base for movement in a first direction parallel to the axis of rotation of said fixture, for movement in a second direction horizontally and perpendicularly to the axis of rotation of said fixture; and a third direction vertically and perpendicularly to the axis of rotation of said fixture;

first stop means for controlling the limits of travel of said machining head in the first direction;

second stop means for controlling the limits of travel of said machining head in the second direction;

third stop means for controlling the limits of travel of said machining head in the third direction;

means for adjusting said first stop means in accordance with measurements of said gauge means so that said machining head is aligned with the certain critical surfaces at the limits of travel of said machining head in the first direction.

2. An apparatus, as claimed in claim 1, further comprising manual control means to permit operator positioning and control of said machining head.

3. An apparatus, as claimed in claim 1, wherein said gauge means is pivotably mounted to said fixture so that said gauge means can be pivoted into a position to measure the position of the certain critical surfaces and pivoted to another noninterfering position so that said machining head can machine those critical surfaces without interference.

4. An apparatus, as claimed in claim 1, wherein said lock means comprises a plate mounted at one end of said fixture perpendicular to the axis of rotation of said fixture having radially aligned holes in said plate at said predetermined positions, and a plunger pin mounted to said base that is movable in a direction parallel to said axis to engage and disengage said openings in said plate.

5. An apparatus, as claimed in claim 4, further comprising a hydraulic cylinder and piston connected to said plunger pin to cause said plunger pin to engage and disengage said openings in plate.

6. An apparatus, as claimed in claim 1, wherein said leveling means comprises adjustable threaded leveling jacks supporting said frame and leveling plates mounted on said fixture in such a position that the upper edges of said plates may be used to align and level the certain critical surfaces of said side frame.

7. An apparatus, as claimed in claim 1, further comprising automatic control means controlled by said first, second, and third stop means so that the certain critical surfaces can be automatically machined.

8. An apparatus, as claimed in claim 7, wherein the certain critical surfaces are the pedestal roof surfaces at each end of the side frame and the machining head is automatically moved in a sequence of movements to machine both of the pedestal roof surfaces.

9. An apparatus, as claimed in claim 2, wherein said fixture can be rotated to a selected position that will allow machining of other critical surfaces of the side frame by operator control of said manual control means.

* * * * *